US011885620B2

(12) United States Patent
Chen et al.

(10) Patent No.: US 11,885,620 B2
(45) Date of Patent: Jan. 30, 2024

(54) INERTIA DETECTION DEVICE

(71) Applicant: DENSO CORPORATION, Kariya (JP)

(72) Inventors: Chao Chen, Kariya (JP); Naoki Yoshida, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/664,699

(22) Filed: May 24, 2022

(65) Prior Publication Data

US 2022/0381562 A1 Dec. 1, 2022

(30) Foreign Application Priority Data

May 28, 2021 (JP) ................................ 2021-090410

(51) Int. Cl.
| | |
|---|---|
| *G01P 15/04* | (2006.01) |
| *G01C 25/00* | (2006.01) |
| *G01P 21/00* | (2006.01) |
| *G01C 19/5776* | (2012.01) |
| *G01P 15/18* | (2013.01) |
| *G01P 15/14* | (2013.01) |

(52) U.S. Cl.
CPC ....... *G01C 19/5776* (2013.01); *G01C 25/005* (2013.01); *G01P 15/04* (2013.01); *G01P 15/14* (2013.01); *G01P 15/18* (2013.01); *G01P 21/00* (2013.01)

(58) Field of Classification Search
CPC .......... G01P 15/04; G01P 15/14; G01P 15/18; G01P 1/00; G01P 1/02; G01P 1/026; G01P 1/023; G01P 21/00; G01P 21/02; G01C 19/5776; G01C 25/005
See application file for complete search history.

(56) References Cited

U.S. PATENT DOCUMENTS

| | | | | |
|---|---|---|---|---|
| 4,280,188 A | * | 7/1981 | Weinstein | G01C 21/188 |
| | | | | 74/5.34 |
| 6,925,413 B2 | * | 8/2005 | Krieg | G01C 21/183 |
| | | | | 702/152 |
| 8,794,065 B1 | * | 8/2014 | Yang | G01P 1/023 |
| | | | | 73/504.16 |
| 9,170,105 B1 | * | 10/2015 | Goodzeit | G01C 21/165 |

(Continued)

FOREIGN PATENT DOCUMENTS

| | | |
|---|---|---|
| JP | H11-237404 A | 8/1999 |
| JP | 2004-361127 A | 12/2004 |

(Continued)

*Primary Examiner* — Helen C Kwok
(74) *Attorney, Agent, or Firm* — MASCHOFF BRENNAN

(57) ABSTRACT

An inertia detection device includes one set of gyro sensors for detecting an angular velocity of a detection target object along a same direction, the gyro sensors arranged in a same physical quantity range, in which sensor movement is detectable as a same physical quantity. When an abnormality affecting an output signal of one of the gyro sensors is caused, based on an observation that a difference of magnitudes of the output signals from normal and abnormal gyro sensors is different from a difference of magnitudes of the output signals from two normal gyro sensors, such an abnormality of one of the gyro sensors is determinable by a comparison between the output signals, without using an estimated value thereof.

19 Claims, 7 Drawing Sheets

(56) References Cited

U.S. PATENT DOCUMENTS

| | | | | |
|---|---|---|---|---|
| 2002/0165688 | A1* | 11/2002 | Hermann | G01C 21/16 |
| | | | | 702/153 |
| 2007/0214886 | A1* | 9/2007 | Sheynblat | G01C 21/166 |
| | | | | 73/509 |
| 2010/0011858 | A1 | 1/2010 | Sato | |
| 2010/0089155 | A1* | 4/2010 | Sugihara | G01C 21/166 |
| | | | | 73/497 |
| 2013/0069621 | A1 | 3/2013 | Sato | |
| 2016/0097640 | A1* | 4/2016 | Hanson | G01C 21/166 |
| | | | | 73/504.08 |
| 2017/0030715 | A1* | 2/2017 | Song | B64C 39/024 |
| 2018/0094928 | A1* | 4/2018 | Endean | G01R 35/005 |
| 2019/0056239 | A1* | 2/2019 | Park | G01C 19/5726 |
| 2020/0217871 | A1* | 7/2020 | Mac | G01C 21/166 |
| 2021/0072278 | A1* | 3/2021 | Horton | G01C 21/18 |
| 2021/0247420 | A1* | 8/2021 | Okano | G01P 13/00 |
| 2022/0057426 | A1* | 2/2022 | Hiyoshi | G01P 1/06 |

FOREIGN PATENT DOCUMENTS

| | | | |
|---|---|---|---|
| JP | 2005-283513 A | 10/2005 | |
| JP | 2012-063184 A | 3/2012 | |

\* cited by examiner

INERTIA DETECTION DEVICE

CROSS REFERENCE TO RELATED APPLICATION

The present application is based on and claims the benefit of priority of Japanese Patent Application No. 2021-090410, filed on May 28, 2021, the disclosure of which is incorporated herein by reference.

TECHNICAL FIELD

The present disclosure generally relates to an inertia detection device, and more particularly to an inertia detection device that easily detects an abnormality of an inertia sensor.

BACKGROUND INFORMATION

A comparative example discloses a device that detects the yaw rate and determines whether the yaw rate sensor is out of order. This comparative example compares a detected yaw rate, which is a yaw rate detected by a yaw rate sensor, with an estimated yaw rate, which is a yaw rate estimated based on information detected by a sensor other than the yaw rate sensor. Based on the comparison result, it is determined whether or not the yaw rate sensor is out of order.

SUMMARY

It is an object of the present disclosure is to provide an inertia detection device capable of determining an abnormality of an inertia sensor without using an estimated value.

BRIEF DESCRIPTION OF THE DRAWINGS

Objects, features, and advantages of the present disclosure will become more apparent from the following detailed description made with reference to the accompanying drawings, in which.

DETAILED DESCRIPTION

First Embodiment

Figure 1:
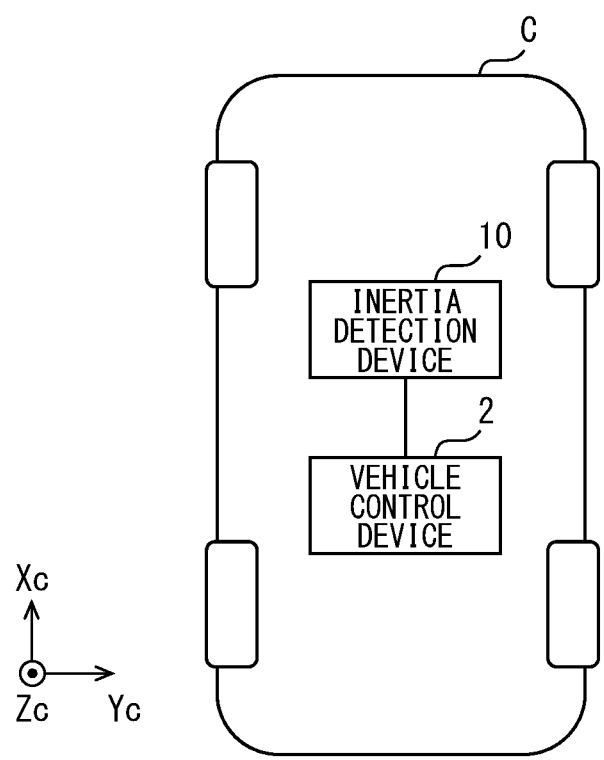
FIG. 1 is a diagram showing that an inertia detection device is mounted on a vehicle.

The following will describe an embodiment of the present disclosure with reference to the drawings. As shown in FIG. 1, an inertia detection device 10 is mounted on a vehicle C. In the following description, the front-rear direction of the vehicle C is denoted as an Xc axis direction, the width direction of the vehicle C is denoted as a Yc axis direction, and the vertical direction of the vehicle C is denoted as a Zc axis direction. The Xc axis is positive in a front direction of the vehicle C, the Yc axis direction is positive in a right direction of the vehicle C, and the Zc axis is positive in an upward direction of the vehicle C. The inertia detection device 10 detects a physical quantity generated in the vehicle C, which is a detection target object. The physical quantities may be, more specifically, an angular velocity and an acceleration. As long as the inertia detection device 10 can detect the angular velocity and the acceleration generated in the vehicle C, there is no limitation on the position where the inertia detection device 10 is mounted in the vehicle C.

The inertia detection device 10 outputs the detected angular velocity and acceleration to a vehicle control device 2. The vehicle control device 2 acquires the angular velocity and acceleration from the inertia detection device 10. The vehicle control device 2 also acquires other information required for determining the behavior of the vehicle C, such as the position and speed of the vehicle C. The vehicle control device 2 controls the vehicle C based on the acquired information.

Figure 2:
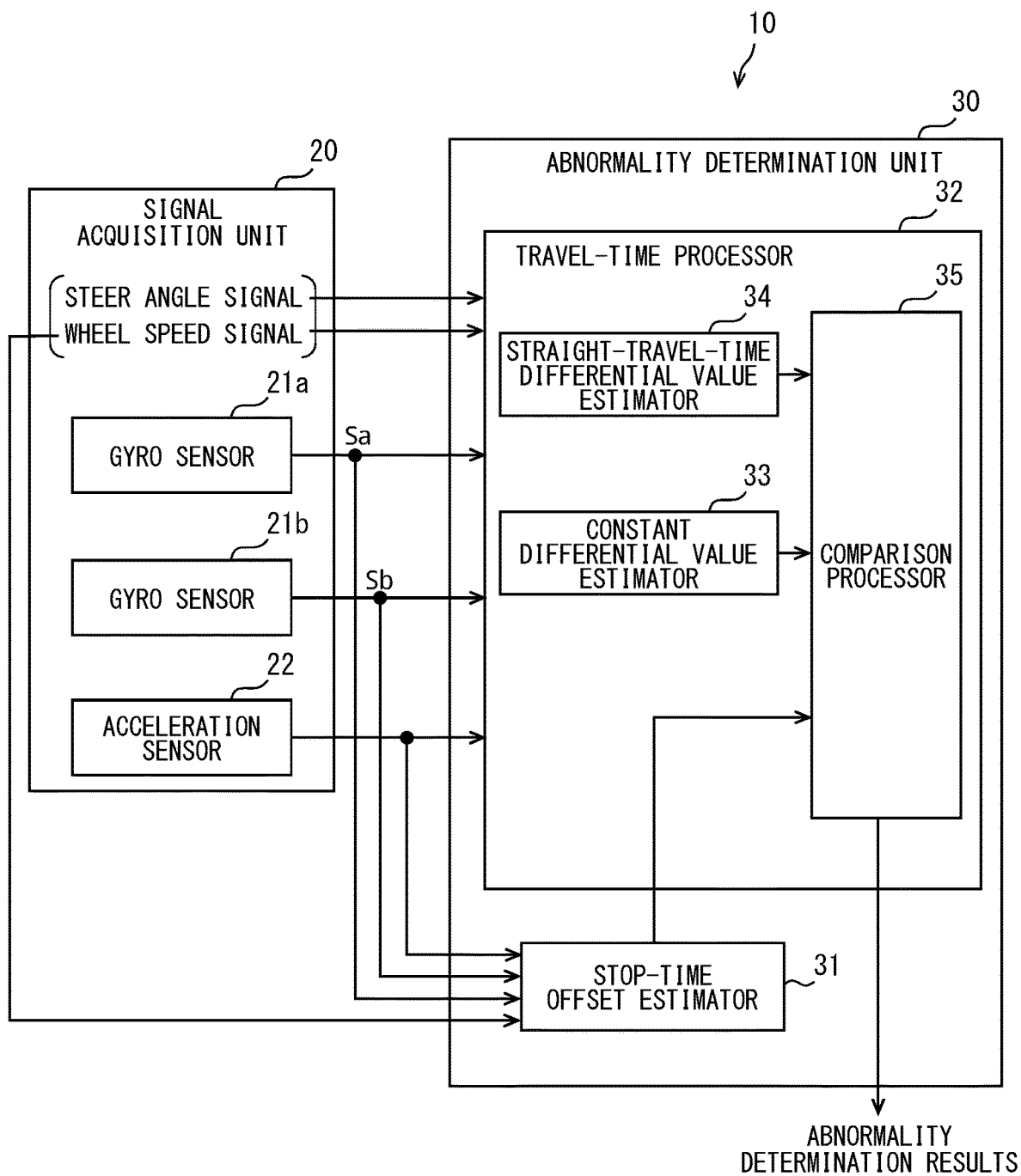
FIG. 2 is a diagram showing an electrical configuration of the inertia detection device.

FIG. 2 is a diagram showing an electrical configuration of the inertia detection device 10. The inertia detection device 10 includes a signal acquisition unit 20 and an abnormality determination unit 30.

[Configuration of Signal Acquisition Unit 20]

The signal acquisition unit 20 includes one set of gyro sensors 21 (a first gyro sensor 21a and a second gyro sensor 21b) and one acceleration sensor 22. In addition, a steer angle signal and a wheel speed signal are also acquired from other sensors mounted on the vehicle C.

Two gyro sensors 21a and 21b may be sensors of the same type. The same type means that the detection method, manufacturer, product number or model number are the same. There are no restrictions on the detection method. For example, a vibration type gyro sensor can be used. In the present embodiment, a vibration type gyro sensor manufactured by MEMS technology is used. When the two gyro sensors 21a and 21b are not distinguished, it is described as the gyro sensor set 21. The gyro sensor set 21 detects the angular velocity generated in the vehicle C. The gyro sensor set 21 of the present embodiment detects the angular velocity around three axes. Note that a gyro sensor that detects the angular velocity around two axes and/or a gyro sensor that detects the angular velocity around one axis may also be used.

The acceleration sensor 22 detects an acceleration generated in the vehicle C. The acceleration sensor 22 may detect accelerations in each of the three axial directions. Alternatively, the acceleration detected by the acceleration sensor may only be in one axial direction or in two axial directions.

The signal acquisition unit 20 is configured to include a processor for acquiring and outputting a signal. The processor communicates with another sensor mounted on the vehicle C or a control device that controls the sensor in order to acquire the steer angle signal and the wheel speed signal. Further, the processor outputs signals detected by various sensors to the abnormality determination unit 30.

[Arrangement of Gyro Sensor Set 21]

Figure 3:
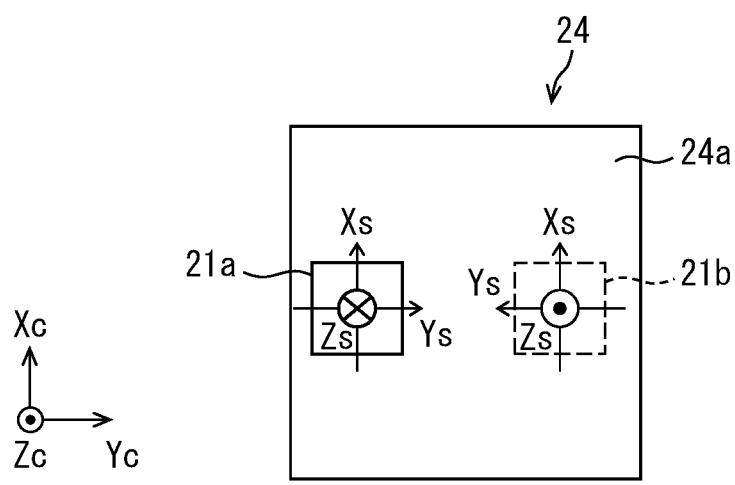
FIG. 3 is a plan view showing an arrangement of gyro sensors.
Figure 4:
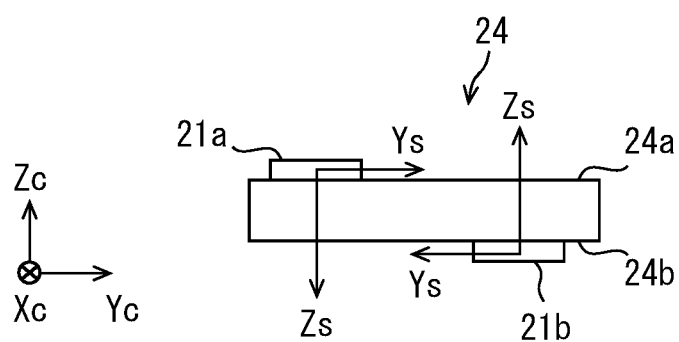
FIG. 4 is a side view showing the arrangement of the gyro sensors.

FIGS. 3 and 4 show an arrangement of the gyro sensor set 21. In the first embodiment and the second and subsequent embodiments, a mounting orientation of the gyro sensor set 21 is set in advance. In one embodiment, the gyro sensor set 21 is mounted on one substrate 24. However, in FIG. 3 the gyro sensor 21*a* is mounted on an upper surface 24*a* of the substrate 24, and the gyro sensor 21*b* is mounted on a lower surface 24*b* of the substrate 24. These surfaces are defined as mounting surfaces.

The three axes for gyro 21*a* in FIG. 3 are an Xs axis, a Ys axis, and a Zs axis. The gyro sensor 21*a* detects the angular velocity around the Xs axis, the angular velocity around the Ys axis, and the angular velocity around the Zs axis. The Xs axis, the Ys axis, and the Zs axis are detection reference axes that define the direction of the gyro sensor 21*a* and specify in which direction the angular velocity is detected. The gyro sensor 21*b* is oriented differently than the gyro sensor 21*a*.

In both of the two gyro sensors 21, the Xs axis and the Ys axis extend along the mounting surface. On the other hand, the Zs axis is orthogonal to the mounting surface. In the two gyro sensors 21*a* and 21*b*, the Xs axes are in the same direction, but the Ys axes are 180 degrees opposite to each other. The Zs axes of the two gyro sensors 21*a* and 21*b* are also 180 degrees opposite to each other in the two gyro sensors 21*a* and 21*b*. Further, the Xs axis is parallel to the Xc axis, the Ys axis is parallel to the Yc axis, and the Zs axis is parallel to the Zc axis. Since the Zc axis is the vertical direction of the vehicle C, the Zs axis is the vertical axis.

In the present embodiment, an angular velocity around the Xs axis detected by the gyro sensor 21 is a roll rate of the vehicle C. An angular velocity around the Ys axis detected by the gyro sensor 21 is a pitch rate of the vehicle C. An angular velocity around the Zs axis detected by the gyro sensor 21 is a yaw rate of the vehicle C.

In the present embodiment, as will be described later, it is determined whether a signal indicative of the yaw rate (hereinafter, yaw rate signal), a signal indicative of the yaw rate (hereinafter, pitch rate signal), and a signal indicative of the roll rate (hereinafter, roll rate signal) regarding the gyro sensor 21 are abnormal. That is, in the present embodiment, it is determined whether or not each of three types of output signals is abnormal. However, unlike the above, it may also be determined whether or not one or two types of output signals are abnormal.

When a set of gyro sensors 21 are arranged at the positions and orientations shown in FIGS. 3 and 4, the signs (+/−) of the yaw rate signal, which is one of the output signals output by the set of gyro sensors 21, is acquired by the gyro sensor 21, are opposite to each other, when the set of gyro sensors 21 are normal. In such manner, the arrangement in which the signals for determining the abnormality are (or should be) opposite to each other is referred to as an inverted arrangement. In other words, the Zs axes of the sensors 21*a* and 21*b* are pointing in parallel but opposite directions in FIG. 4, this may be described as "antiparallel" or as inverted.

The yaw rate signals output by a set of gyro sensors 21 have opposite signs. However, since one set of gyro sensors 21 is mounted on the same substrate 24, the physical quantities detected by one set of gyro sensors 21, specifically, the magnitudes (that is, absolute values) of the yaw rate, pitch rate, and roll rate should be equal other among the sensors 21*a* and 21*b*. Therefore, the magnitude of the output signals output by the set of gyro sensors 21 should be equal. Note that equality in the output signal does not mean that they are completely (exactly) equal. If the difference in the absolute value of the output signals is substantially equal to an individual sensor difference or the like, such a situation is considered that the set of gyro sensors 21 is a state of equality (equal to each other). In other words, the magnitudes should be approximately equal.

In the present embodiment, one set of gyro sensors 21 is arranged on the same substrate 24. However, one set of gyro sensors 21 does not have to be arranged on the same substrate 24. That is, they may be arranged in the same physical quantity range. The same physical quantity range is a range where sensor movement is detected as a same physical quantity, which may mean that the physical quantity detected by the inertia sensor moves along the same value among the set of sensors 21. The physical quantities detected by the gyro sensor 21 are a yaw rate, a roll rate, and a pitch rate. For example, even if they are mounted on the same vehicle C, the true value differs depending on the mounting position, for example, the yaw rate differs depending on the sensor positions, e.g., between the center of the vehicle C and the front and rear ends of the vehicle C. However, when the difference in the true value from the sensors 21 due to the difference of the mounting positions is substantially within a range of the detection error of the gyro sensors 21, i.e., within a range of the individual sensor differences or the like, it is determinable as the same physical quantity range.

Figure 5:
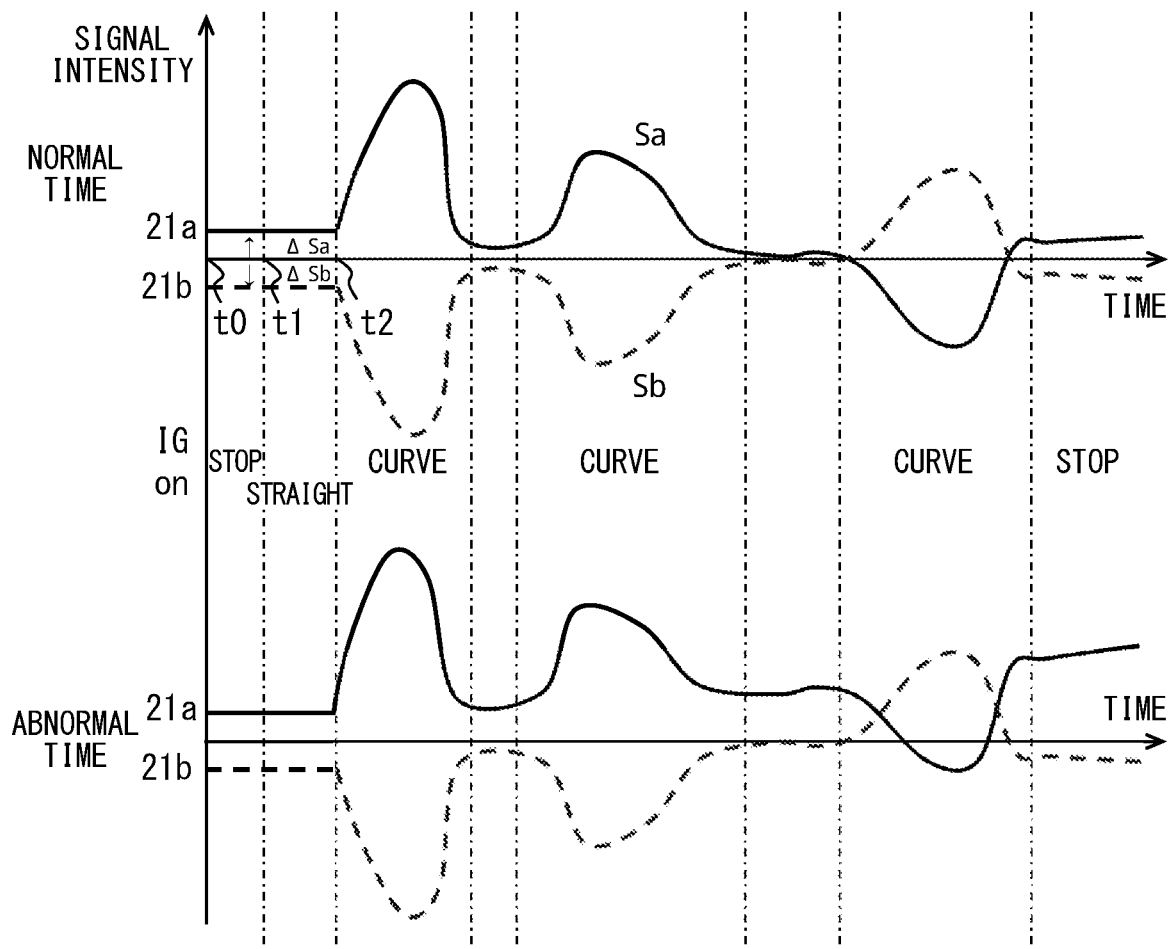
FIG. 5 is a diagram conceptually showing a change in a yaw rate signal.

FIG. 5 conceptually shows the change in the yaw rate signal detected by the gyro sensors 21*a* and 21*b*. In FIG. 5, a solid line is the yaw rate signal detected by the gyro sensor 21*a*, and a broken line is the yaw rate signal detected by the gyro sensor 21*b*. The upper part of FIG. 5 shows the yaw rate signals when both the gyro sensors 21*a* and 21*b* are normal, and the lower part of FIG. 5 shows the yaw rate signals when the gyro sensor 21*a* becomes abnormal. Recall that in FIG. 4 the Zs axis of gyro sensor 21*a* points downward, and the Zs axis of the gyro sensor 21*b* points upward. Thus, these axes are parallel and pointing in opposite directions (sometimes called "anti-parallel"). Under normal conditions, these sensors should produce signals with (approximately) equal magnitudes and opposite signs, such that they (approximately) add to zero.

If these axes pointed in the same direction, then under normal conditions a difference of these signals should add to zero.

In other words, in both cases (parallel case or anti-parallel case), the magnitudes of the signals should be approximately equal when operating normally (see upper part of FIG. 5.).

As shown in FIG. 5, in the normal time, the yaw rate signals output by the gyro sensors 21*a* and 21*b* have opposite signs and are of equal magnitude (for anti-parallel Zs axes in FIG. 4). In an example of FIG. 5, an ignition switch of the vehicle C is turned on at time t0, and the vehicle C is stopped until time t1. The vehicle C is traveling straight from time t1 to time t2. Since the yaw rate when the vehicle C is stopped and traveling straight is 0, the yaw rate signal at these times is stable at a (relatively small) constant value. Such a constant value is used as an offset value.

On the other hand, in a curve, the yaw rate signal changes greatly. However, as can be seen from the solid line and the broken line in the normal time (top half) of FIG. 5, if both of the two gyro sensors 21 are normal, the yaw rate signals output by the two gyro sensors 21 have the same magnitude and the signs are opposite regardless of the traveling state of the vehicle C.

On the other hand, when the gyro sensor 21a becomes abnormal, the magnitudes of the yaw rate signals output by the two gyro sensors 21 do not become the same, as shown by an example in the lower part of FIG. 5. These non-equal magnitudes are clearly shown at the far right of the lower half of FIG. 5, where the magnitude of solid line is approximately five times greater than the magnitude of the dashed line.

Utilizing such a fact, the abnormality determination unit 30 determines whether or not any of the gyro sensors 21 is abnormal.

[Configuration of Abnormality Determination Unit 30, FIG. 2]

The following description is about FIG. 2. The abnormality determination unit 30 is realized by one microcontroller. The microcontroller is configured to include at least one processor. For example, the abnormality determination unit 30 includes a processor, a non-volatile memory, a RAM, an I/O, a bus line connecting these configurations, and the like. The non-volatile memory stores a program for operating a general-purpose microcontroller as an abnormality determination unit 30. When the processor executes a program stored in the non-volatile memory while using a temporary storage function of the RAM, the abnormality determination unit 30 operates as a stop-time offset estimator 31 and a travel-time processor 32. Execution of these operations means that the method corresponding to the program is executed.

The stop-time offset estimator 31 estimates an offset value of the output signal output by the gyro sensor 21, by using the output signal detected by the gyro sensor 21 when the vehicle C is stopped. The offset value is a magnitude of the output signal output by 21 when the angular velocity is zero.

The stop-time offset estimator 31 can use various signals to determine that the vehicle C is stopped. For example, the stop-time offset estimator 31 can determine that the vehicle C is stopped when the wheel speed signal indicates that the vehicle speed is zero. Alternatively, the stop-time offset estimator 31 may determine that the vehicle C is stopped when, in addition to an indication that the wheel speed signal indicates that the vehicle speed is zero, an acceleration signal output by the acceleration sensor 22 indicates that no acceleration in the front-rear direction of the vehicle C is zero.

The stop-time offset estimator 31 stores, in a memory, the output signals detected by the gyro sensors 21a and 21b at least two times, i.e., at time ts−1 and time ts while the vehicle C is determined to be stopped. The time difference between time ts and time ts−1 is set in advance.

The travel-time processor 32 includes a constant differential value estimator 33, a straight-travel-time differential value estimator 34, and a comparison processor 35. The constant differential value estimator 33 constantly and periodically estimates a differential value while the vehicle C is traveling. The Coriolis force due to rotation acts differentially on the gyro sensors 21, and a differential value means an output signal of the gyro sensor 21. The constant differential value estimator 33 can determine whether or not the vehicle C is traveling based on the wheel speed signal. The constant differential value estimator 33 provides the comparison processor 35 with an output signal of the gyro sensor 21 when it is determined that the vehicle C is stopped.

The straight-travel-time differential value estimator 34 estimates a differential value while the vehicle C is traveling straight. The straight-travel-time differential value estimator 34 can determine that the vehicle C is traveling straight from the wheel speed signal and the steer angle signal. Note that the differential value estimator 34 estimates the differential value when the vehicle C is traveling straight, thereby the constant differential value estimator 33 may be configured not to estimate the differential value when the vehicle C is traveling straight. The straight travel differential value may be different than the stopped differential value.

The constant differential value estimator 33 and the straight-travel-time differential value estimator 34 acquire output signals from the two gyro sensors 21, respectively. Specifically, the output signals may be: yaw rate signals, roll rate signals, and/or pitch rate signals.

The comparison processor 35 generates an abnormality determination signal for determining an abnormality of the gyro sensor 21 based on the output signals output by the set of gyro sensors 21. The abnormality determination signal is a signal for determining an abnormality of a predetermined axial component or around-axis component of the output signal of the inertia sensor. When the inertia sensor is the gyro sensor 21, the abnormality determination signal is a signal for determining a signal component around at least one of the Xs axis, the Ys axis, and the Zs axis.

As will be described later in the embodiment, the abnormality determination signal may be a component of a part of the output signal. Since a part of the output signal is also included, the abnormality determination signal can also be said as an abnormality determination component. However, in the present embodiment, the abnormality determination signal is an entire output signal. Specifically, the abnormality determination signal in the present embodiment is a yaw rate signal, a roll rate signal, and a pitch rate signal. In the present embodiment, the abnormality determination signal is determined by acquiring one or more of: the yaw rate signal, the roll rate signal, and the pitch rate signal.

The comparison processor 35 compares the magnitudes of the abnormality determination signals acquired respectively from one set of gyro sensors 21. The yaw rate signal and the pitch rate signal have opposite signs to each other between the two gyro sensors 21, such as the Zs signals in FIG. 4. When the signs are opposite, Sa+Sb indicates the result of comparing (subtracting) the magnitudes of the abnormality determination signals. Note that Sa is an output signal of the gyro sensor 21a, and Sb is an output signal of the gyro sensor 21b. The roll rate signal has the same sign between the two gyro sensors 21. When the abnormality determination signal is a roll rate signal, a difference between the two roll rate signals becomes a value indicating the result of comparing the magnitudes of the abnormality determination signals. Note, there are two small regions in the lower half of FIG. 5 wherein both signals are positive. In these two small regions, Sa+Sb will NOT give a correct result for comparing magnitudes. In these small regions, abs[abs(Sa)−abs(Sb)] will give the correct comparison result, and will also give the correct result in all regions. The function "abs" is an absolute value function. Further, abs[abs(Sa)−abs(Sb)] can be used for parallel axes, such as Xs for both sensors in FIG. 3.

The comparison processor 35 determines whether or not any of the gyro sensors 21 is abnormal by using a value indicating the result of comparing the magnitudes of the abnormality determination signals. In the present embodiment, the comparison processor 35 determines whether or not any of the gyro sensors 21 is abnormal by comparing the difference in the magnitudes of the abnormality determination signals with a difference threshold value THd. When the difference in magnitudes of the abnormality determination signals is smaller than the difference threshold value THd, the comparison processor 35 determines that all the gyro sensors 21 are normal. When the difference in magnitudes of the abnormality determination signals is greater than the difference threshold value THd, the comparison processor 35 determines that one of the gyro sensors 21 is abnormal. Since the difference in magnitudes of the yaw rate signal and the pitch rate signal is represented by Sa+Sb, when the following equation 1 is satisfied, the comparison processor 35 determines that one of the gyro sensors 21 is abnormal. As previously discussed, the function abs(abs(Sa)−abs(Sb)) is more consistent, and can also be used parallel axes. However, Sa+Sb addition can easily be performed by an analog circuits, whereas the absolute value function is much more complex.

$Sa+Sb>THd$ (Equation 1, abnormality in antiparallel axes)

When the comparison processor 35 determines that any of the gyro sensors 21 is abnormal, the comparison processor 35 further determines which one of the gyro sensors 21 is abnormal. In order to determine which one of the gyro sensors 21 is abnormal, the comparison processor 35 compares the change in the output signal in the stable state with the output signal threshold values THa and THb determined for respective sensors. The stable state is when the vehicle is stopped.

The output signal threshold value THa is a threshold value for the output signal of the gyro sensor 21*a*, and the output signal threshold value THb is a threshold value for the output signal of the gyro sensor 21*b*. These output signal threshold values THa and THb are set in advance in consideration of individual sensor differences of the gyro sensors 21*a* and 21*b*. Further, the output signal threshold values THa and THb may be updated based on the output signal detected when the vehicle C is in a stable state.

In the gyro sensor 21, a stable state is when the vehicle C is stopped (or when the vehicle C is traveling straight). This is because when the vehicle C is stopped and (or when the vehicle C is traveling straight), the yaw rate, the pitch rate, and the roll rate generated in the vehicle C should all be zero and stable. Being stopped may be determined by the wheel speed signal. Traveling straight may be determined by the steer angle signal).

In the present embodiment, as the change of the output signal in the stable state, the offset change amounts ΔSa and ΔSb indicating the time change of the offset value when the vehicle is stopped are calculated. Let the offset change amount of the gyro sensor 21*a* be ΔSa, and the offset change amount of the gyro sensor 21*b* be ΔSb. These can be calculated by Equations 2 and 3, respectively.

$\Delta Sa=Sa(ts)-Sa(ts-1)$ (Equation 2)

$\Delta Sb=Sb(ts)-Sb(ts-1)$ (Equation 3)

Sa (ts) is an output signal of the gyro sensor 21*a* at time ts. The output signal is, for example, a yaw rate signal. Sa (ts−1) is an output signal of the gyro sensor 21*a* at time ts−1. Sb (ts) is an output signal of the gyro sensor 21*b* at time ts. Sb (ts−1) is an output signal of the gyro sensor 21*b* at time ts−1. That is, the offset change amounts ΔSa and ΔSb are the differences between the output signals (that is, offset values) detected by the gyro sensors 21*a* and 21*b* at time ts−1 and the output signals detected by the gyro sensors 21*a* and 21*b* at time ts−1.

The offset change amounts ΔSa and ΔSb ideally become zero, and when a sensor failure or the like occurs and the output signal becomes abnormal, the offset change amounts ΔSa and ΔSb may become values far from zero (due to large fluctuations over time).

The comparison processor 35 can calculate the offset change amounts ΔSa and ΔSb using the offset values already stored in the memory when any of the gyro sensors 21 is determined as having abnormality. However, if the time difference between a time when any of the gyro sensors 21 is determined as abnormal and a detection time of the output signal stored in the memory is greater than a predetermined fixed time difference, no output signal stored in the memory is used. Even if one of the gyro sensors 21 appears to be abnormal at present, if the detection time of the output signal is too old, it is highly possible that none of the gyro sensors 21 was abnormal at the time of detecting such an output signal.

When the comparison processor 35 does not use the output signal stored in the memory, the offset change amounts ΔSa and ΔSb are calculated by using the output signal detected by the stop offset estimator 31 after determining that one of the gyro sensors 21 is determined as abnormal. Alternatively, the offset change amounts ΔSa and ΔSb may be calculated using the output signal acquired by the straight-travel-time differential value estimator 34 during straight travel.

The comparison processor 35 compares the offset change amounts ΔSa and ΔSb with the output signal threshold values THa and THb (also known as offset change threshold values). If ΔSa>THa and ΔSa<THb, the comparison processor 35 determines that the gyro sensor 21*a* is abnormal. If ΔSa<THa and ΔSa>THb, the comparison processor 35 determines that the gyro sensor 21*b* is abnormal. This determination may be performed for the yaw rate signal, the roll rate signal and the like. A detailed discussion of four possible outcomes is provided below, in the next section.

The abnormality determination unit 30 outputs an abnormality determination result determined by the comparison processor 35 to the vehicle control device 2. The abnormality determination result may include information that identifies the gyro sensor 21 that is determined as abnormal. The abnormality determination unit 30 also has a function of outputting the sensor signal acquired from the signal acquisition unit 20 to the vehicle control device 2. The abnormality determination result may be that an output signal or signals determined as abnormal is not output to the vehicle control device 2. When the abnormality determination unit 30 determines that both of the two gyro sensors 21 are normal, the abnormality determination unit 30 may provide both of the output signals output by the two gyro sensors 21 to the vehicle control device 2. Further, only one of the two signals may be provided in a predetermined manner, or the absolute values of the two output signals may be averaged to determine the signal to be provided to the vehicle control device 2.

Summary of the First Embodiment

The inertia detection device 10 of the first embodiment described above includes one set of (specifically, two) gyro sensors 21*a* and 21*b* for detecting the yaw rate generated in the vehicle C, and these two gyro sensors 21*a* and 21*b* are arranged in the same physical quantity range.

Since such arrangement is used, if an abnormality that affects the output signal occurs in either one of the gyro sensors 21, the difference in magnitude between the two output signals is different from (greater than) that in the normal time. Utilizing such feature, the abnormality determination unit 30 can compare the magnitudes of the output signals output by the two gyro sensors 21 and determine whether or not any of the gyro sensors 21 is abnormal. Since whether or not the gyro sensor 21 is abnormal is determined in such manner, it is possible to determine whether or not the gyro sensor 21 is abnormal without using an estimated value.

The two gyro sensors 21 are arranged in an inverted arrangement in which the signs of the yaw rate signal and the pitch rate signal are opposite to each other. By using the inverted arrangement, it is possible to effectively remove the sensitivity error from an abnormality determination.

More practically, the following is devised. The sensor has a sensitivity error depending on the direction of change of the signal. The signal will be specifically described as a yaw rate signal. The sensitivity of the gyro sensor 21 may differ depending on whether the vehicle C turns right or left. It is assumed that the difference from the true value when turning to the right is +δ, and the difference from the true value when turning to the left is −δ. Assuming that the true value is ω, one yaw rate signal is ω+δ and the other yaw rate signal is ω−δ. Adding these two gives 2ω. Therefore, since the sensitivity error is canceled out, the sensitivity error can be effectively removed from an abnormality determination. On the other hand, when the two yaw rate signals are both ω+δ, the addition of the two yaw rate signals gives 2ω+2δ. In such case, it is not possible to distinguish whether 2δ is due to a sensitivity error or an abnormality.

Further, the abnormality determination unit 30 can compare the offset change amounts ΔSa and ΔSb, which are the changes in the offset value estimated when the vehicle is stopped, with the output signal threshold values THa and THb, and can determine which gyro sensor 21 is abnormal.

In other words, in one embodiment a first step is to determine whether an abnormality exists based on comparing magnitudes. If the comparison is greater than an abnormality threshold THd (Sa+Sb>THd for antiparallel axes?), then a second step is to identify which sensor is abnormal based upon offset change thresholds THa and THb. Specifically, test ΔSa>THa? and/or test ΔSb>THb?. Using absolute values is preferable for the first step of comparing magnitudes: abs[abs(Sa)−abs(Sb)]>THd?.

Note, there are four possible outcomes when trying to identify an abnormal sensor in a sensor pair by comparing the offset change amounts against their thresholds (after the magnitude comparison test in step 1 above determined that an abnormality exists):

1. Sensor 21a appears abnormal: ΔSa>THa and ΔSb≤THb.
   In outcome 1, sensor 21a appears abnormal, and sensor 21b appears normal. Thus, sensor 21b may be used.
2. Sensor 21b appears abnormal: ΔSa≤THa and ΔSb>THb.
   In outcome 2, sensor 21a appears normal, and sensor 21b appears abnormal. Thus, sensor 21a may be used.
3. Type A indeterminate: ΔSa>THa and ΔSb>THb.
   In outcome 3 (type A indeterminate), it appears that both sensors are abnormal, because both sensors failed the offset change threshold test. It is possible that both sensors are abnormal. Probably neither sensor should be used in this outcome.
4. Type B indeterminate: ΔSa≤THa and ΔSb≤THb.
   In outcome 4 (type B indeterminate), it appears that both sensors are normal, because both sensors passed the offset change threshold test. However, the magnitude comparison test (first step discussed above) indicated that at least one of the sensors is abnormal. Probably neither sensor should be used in this outcome.

Additionally, one embodiment may use a simplified analysis. If we ignore the indeterminate cases (3 and 4 above), or if we assume that they have negligible probabilities, then we only need to make one comparison, is ΔSa≤THa?

If YES, then sensor 21a is normal, and we assume that sensor 21b is abnormal.
If NO, then sensor 21a is abnormal, and we assume that sensor 21b is normal.

This simplified analysis is not preferred, because it ignores the possibility that both sensors are abnormal (type A indeterminate), and ignores the possibility that both sensors are normal (type B indeterminate).

Note that, in the present embodiment, whether or not any of the gyro sensors 21 has an abnormality is determined (first step) based on the difference in the magnitude of the output signal acquired during traveling, not based on the offset change amounts ΔSa and ΔSb (second step). The reason for using such scheme is that by comparing the difference in the magnitudes of the output signals (first step), it is possible to effectively remove errors that occur in the plurality of gyro sensors 21 even in the normal time, such as the sensitivity error described above, for an abnormality determination.

The abnormality determination unit 30 is realized by at least one microcontroller, and such microcontroller acquires output signals from all of the gyro sensors 21. Such configuration eliminates the need for time synchronization between the plurality of microcontrollers, unlike the case where the plurality of microcontrollers separately acquire the output signals from the gyro sensor 21.

Figure 6:
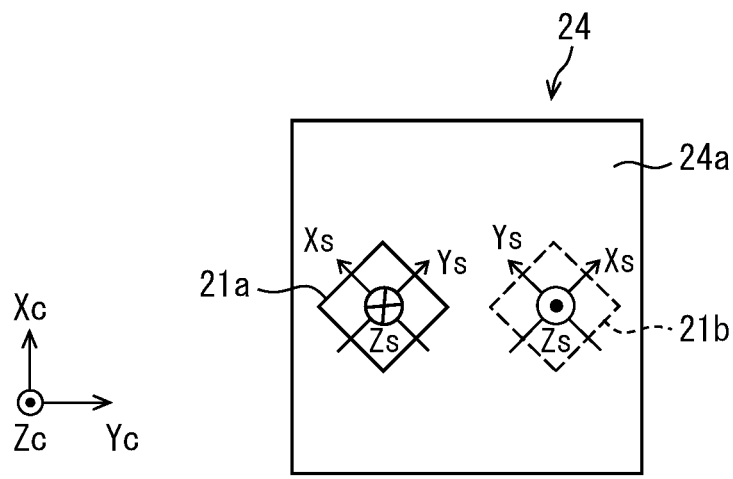
FIG. 6 is a diagram showing an arrangement of gyro sensors in a second embodiment.

Second Embodiment, FIG. 6

Next, the second embodiment will be described. In the following description of the second embodiment, elements having the same reference numerals as those used so far are the same as the elements having the same reference numerals in the previous embodiment, except when specifically mentioned. When only a part of the configuration is described, the embodiment described above can be applied to other parts of such configuration.

FIG. 6 shows an arrangement of the gyro sensors 21a and 21b in the second embodiment. In the second embodiment, the orientation of the gyro sensor 21a on the upper surface 24a of the substrate 24 and the orientation of the gyro sensor 21b on the lower surface 24b of the substrate 24 are different from those of the first embodiment.

The orientations of the Zs axes of the two gyro sensors 21a and 21b are 180 degrees opposite to each other, and the arrangement shown in FIG. 6 is also an example of the inverted arrangement. In the second embodiment, in the gyro sensors 21a and 21b, the Xs axis and the Ys axis form an angle of 45 degrees with the Xc axis and the Yc axis of the vehicle C. The abnormality determination unit 30 performs the same processing as in the first embodiment to determine whether or not the gyro sensor 21 has an abnormality. According to the second embodiment, the same effect as that of the first embodiment is achievable.

The vehicle control device 2 uses one or both of (i) an output signal indicating the angular velocity around the Xs axis and (ii) an output signal indicating the angular velocity around the Ys axis respectively output by the inertia detection device 10, for calculating an angular velocity component around the Xc axis and an angular velocity component around the Yc axis indicated by those output signals.

In such manner, even when (i) one of the gyro sensors 21 is abnormal and (ii) the remaining one gyro sensor 21 also has one abnormal output signal among output signals indicating the angular velocity around the Xs and Ys axes, the other of the output signals indicating the angular velocity around the Xs or Ys axis allows the vehicle control device 2 to continue vehicle control. The inertia detection device 10 may calculate the angular velocity component around the Xc axis and the angular velocity component around the Yc axis and output them to the vehicle control device 2.

Third Embodiment

Figure 7:
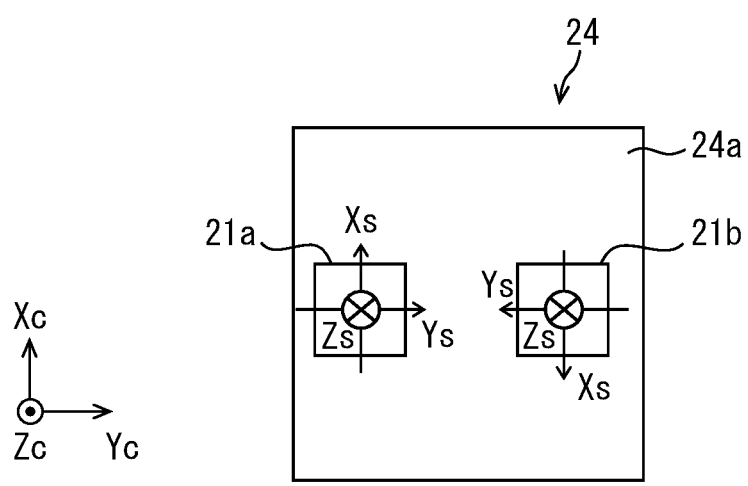
FIG. 7 is a plan view showing the arrangement of the gyro sensors in a third embodiment.

FIG. 7 shows an arrangement of the gyro sensors 21a and 21b in the third embodiment. In the third embodiment, both of the two gyro sensors 21a and 21b are mounted on the same surface of the substrate 24, specifically, on the upper surface 24a. Since it is sufficient to mount the two gyro sensors 21 on the same surface, the mounting work on the substrate 24 is made easy.

The arrangement of the gyro sensor 21a is the same as that of the first embodiment. The gyro sensor 21b has an arrangement in which the gyro sensor 21a is rotated 180 degrees around the Zs axis. Therefore, as shown in FIG. 7, in the third embodiment, the Xs axis and the Ys axis of the gyro sensors 21a and 21b are opposite to each other. The arrangement shown in FIG. 7 is also an example of the inverted arrangement. On the other hand, as shown in FIG. 8, in the third embodiment, the Zs axes of the gyro sensors 21a and 21b are oriented in the same direction.

Figure 8:
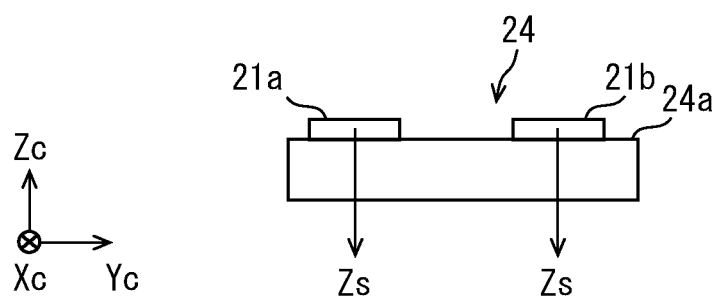
FIG. 8 is a side view showing the arrangement of the gyro sensors in the third embodiment.

When the arrangement of the two gyro sensors 21a and 21b is set as shown in FIGS. 7 and 8, the abnormality determination unit 30 uses the above-mentioned equation 1 for determining abnormality of either of the gyro sensors 21 regarding the roll rate signal and the pitch rate signal. The yaw rate signal, which is a signal around the Zs axis, is used for determining whether or not any of the gyro sensors 21 is abnormal by comparing the absolute value of the difference between Sa and Sb with the difference threshold value THd.

Fourth Embodiment

Figure 9:
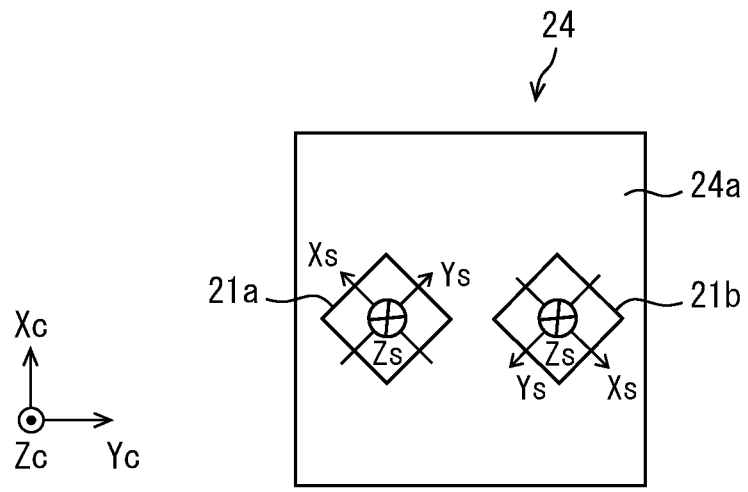
FIG. 9 is a diagram showing an arrangement of the gyro sensors in a fourth embodiment.

FIG. 9 shows an arrangement of the gyro sensors 21a and 21b in the fourth embodiment. Similar to the third embodiment, both of the two gyro sensors 21a and 21b are mounted on the same surface of the substrate 24. Further, in the fourth embodiment, as in the second embodiment, the gyro sensors 21a and 21b have their Xs axes and Ys axes set in an angle of 45 degrees with the Xc axis and the Yc axis of the vehicle C, and the gyro sensors 21a and 21b have their Xs axes and Ys axes opposite to each other. The arrangement shown in FIG. 9 is also an example of the inverted arrangement.

Due to such arrangement, as in the second embodiment, even when one of the gyro sensors 21 is abnormal and the remaining one gyro sensor 21 also has one of the output signals indicating the angular velocity around either of the Xs and Ys axes determined as abnormal, the vehicle control device 2 can continue the vehicle control.

Further, in the fourth embodiment, the two gyro sensors 21a and 21b are both mounted on the upper surface 24a of the substrate 24, and the Zs axes of the gyro sensors 21a and 21b are oriented in the same direction. Therefore, the abnormality determination unit 30 determines the presence or absence of an abnormality by comparing the absolute value of the difference between Sa and Sb and the difference threshold value THd for the yaw rate signal.

Fifth Embodiment

Figure 10:
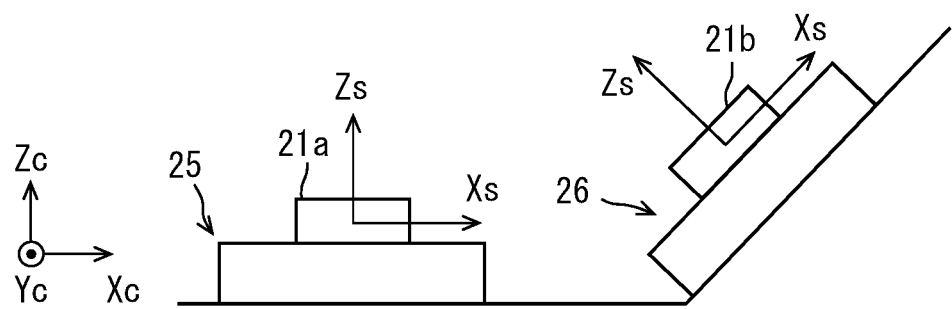
FIG. 10 is a diagram showing an arrangement of the gyro sensors in a fifth embodiment.

FIG. 10 shows an arrangement of the gyro sensors 21a and 21b in the fifth embodiment. The inertia detection device of the fifth embodiment includes two substrates 25 and 26. One substrate 25 is fixed to the vehicle C in the same posture as the substrate 24 of the embodiments described above. The gyro sensor 21a is mounted on the upper surface of the substrate 25. The other substrate 26 is a separate member from the substrate 25, but is arranged at a position close to the substrate 25. The gyro sensor 21b is mounted on the upper surface of the substrate 26. Also in the present embodiment, the two gyro sensors 21 are arranged in the same physical quantity range.

The angle of the substrate 26 is an angle acquired by rotating the substrate 25 about the Xc axis by 45 degrees. The gyro sensor 21a is mounted on the upper surface of one substrate 25, and another gyro sensor 21b is mounted on the upper surface of the other substrate 26. Therefore, the angle formed by the Zs axis of the gyro sensor 21a and the Zs axis of the gyro sensor 21b and the angle formed by the Xs axis of the gyro sensor 21a and the Xs axis of the gyro sensor 21b are both 45 degrees.

In the present embodiment, the abnormality determination unit 30 determines whether or not the signal around the Zs axis and the signal around the Xs axis of the set of the gyro sensors 21 are abnormal as follows. That is, in one output signal, a signal component that is in the same direction as the other output signal is extracted. Then, the extracted signal component is multiplied by a coefficient determined according to the relative inclination of the axis. The value acquired by multiplying the coefficient is used instead of the output signal of the embodiment described above. Since the extracted signal component is used for abnormality determination, it can be said as an abnormality determination component. In the previous embodiments, all of the output signals are abnormality determination components, whereas in the present embodiment, a part of the output signals is an abnormality determination component.

The output signal around the Zs axis will be specifically described as an example. The signal component around the Zc axis is calculated from (i) the signal indicating the angular velocity around the Zs axis detected by the gyro sensor 21b or (ii) the signal indicating the angular velocity around the Xs axis. Then, a value is calculated by multiplying the calculated signal component around the Zc axis by a coefficient determined according to the inclination of the Zs axis or the Xs axis. Such value is used as Sb to determine whether or not the output signal is abnormal. The coefficient determined according to the inclination of the Zs axis or the Xs axis is $1/\cos\theta$, where $\theta$ is the angle formed by the Zs axis or the Xs axis of the gyro sensor 21b and the Zs axis or the Xs axis of the gyro sensor 21a.

The configuration of the fifth embodiment in which the two gyro sensors 21 are separately mounted on the plurality of boards 25 and 26 has, as compared with the configuration in which the two gyro sensors 21 are both mounted on one board 24, higher degree of freedom of mounting than the case in which the two gyro sensors 21 are both mounted on the same substrate 24, since the boards 25 and 26 can both be miniaturized.

In addition, from the output signal around the Zs axis and the output signal around the Xs axis of the gyro sensor 21b, it is possible to calculate a signal to be compared with the output signal around the Zs axis of the gyro sensor 21a, respectively. Further, from each of the output signal around the Zs axis of the gyro sensor 21b and the output signal around the Xs axis, a signal to be compared with the output signal around the Xs axis of the gyro sensor 21a can be calculated. Therefore, for example, even if the output signal around the Zs axis of the gyro sensor 21b becomes abnormal, the abnormality determination unit 30 can continue the abnormality determination of the output signal around the Zs axis of the gyro sensor 21a, by using the output signal around the Xs axis of the gyro sensor 21b. Further, when the abnormality determination can be continued and the determination result indicates that at least one of the output signals is normal, the vehicle control device 2 can continue the vehicle control.

Sixth Embodiment

Figure 11:
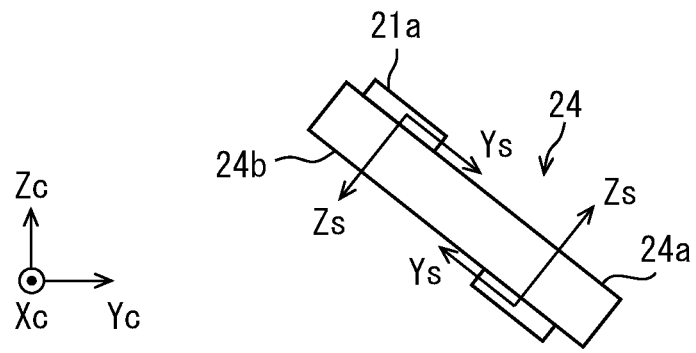
FIG. 11 is a diagram showing an arrangement of the gyro sensors in a sixth embodiment.

FIG. 11 shows an arrangement of the gyro sensors 21a and 21b in the sixth embodiment. The arrangement of the gyro sensors 21a and 21b in the sixth embodiment with respect to the substrate 24 is the same as the first embodiment. However, the substrate 24 is different from the first embodiment in that the substrate 24 is inclined with respect to a plane including the Xc axis and the Yc axis.

Since the relative positions and orientations of the two gyro sensors 21a and 21b are the same as those in the first embodiment, the abnormality determination unit 30 can determine whether or not the output signal from the two gyro sensors 21a and 21b is abnormal by performing the same processing as the first embodiment. Further, based on the angular velocity component around the Xc axis, the angular velocity component around the Yc axis, and the angular velocity component around the Zc axis derivable from the output signals output by the respective gyro sensors 21a and 21b, which are respectively usable as abnormality determination signals, it is possible to determine whether the gyro sensors 21a and 21b is abnormal.

Seventh Embodiment

Figure 12:
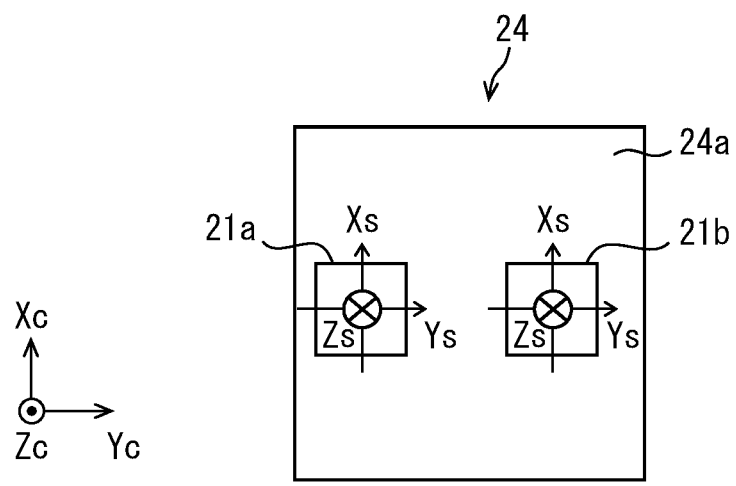
FIG. 12 is a diagram showing an arrangement of the gyro sensors in a seventh embodiment.

FIG. 12 shows an arrangement of the gyro sensors 21a and 21b in the seventh embodiment. In the seventh embodiment, the two gyro sensors 21a and 21b are both arranged on the upper surface 24a of the substrate 24, and the Xs axis, Ys axis, and Zs axis of the gyro sensor 21a respectively have the same orientation as the Xs axis, Ys axis, and Zs axis of the gyro sensor 21b.

When the two gyro sensors 21a and 21b are arranged, the abnormality determination unit 30 uses a signal acquired by reversing the sign of the output signal output by one of the gyro sensors 21 as an abnormality determination signal.

Although the embodiments of the present disclosure have been described above, the present disclosure is not limited to the above embodiments, and various modified examples described below are also included in the technical scope of the present disclosure. Furthermore, various modifications other than the following can be made without departing from the gist.

First Modification

In the embodiment, the number of gyro sensors 21 included in one set of gyro sensors 21 was two. However, the number of gyro sensors 21 included in one set of gyro sensors 21 may be three or more.

Second Modification

In the first to fourth, sixth, and seventh embodiments, the substrate 24 on which the two gyro sensors 21 are mounted may be split into two separate substrates respectively having only one gyro sensor 21.

Third Modification

In the second and fourth embodiments, the angle formed by the Xs axis and the Xc axis and the angle formed by the Ys axis and the Yc axis are 45 degrees. However, if the angle formed is known, it may be other than 45 degrees.

Further, in the fifth embodiment, the angle formed by the Zs axis of the gyro sensor 21a and the Zs axis of the gyro sensor 21b and the angle formed by the Xs axis of the gyro sensor 21a and the Xs axis of the gyro sensor 21b may be other than 45 degrees in a range greater than 0 degree and smaller than 180 degrees.

Fourth Modification

The comparison processor 35 may limit the abnormality determination signal for determining the abnormality of the gyro sensor 21 to the signal acquired when the vehicle C is traveling straight. Since the angular velocity should be zero when traveling straight, limiting the abnormality determination signal to the signal acquired when the vehicle C is traveling straight may improve the abnormality determination accuracy. On the contrary, the comparison processor 35 may exclude the signal when the vehicle C is traveling straight from the abnormality determination signal acquired during traveling, as the abnormality determination signal used for the abnormality determination. In such manner, the abnormality determination is made only for the output signal when the vehicle C is traveling on a curve. Since the detection accuracy of the gyro sensor 21 when traveling on a curve is important, it is possible to make an abnormality determination only for the output signal acquired in an important situation.

Fifth Modification

A set of acceleration sensors may be provided as a set of inertia sensors.

Sixth Modification

In the fifth embodiment, the gyro sensor 21b may be rotated 180 degrees around the Zs axis. In such manner, the component around the Zc axis and the component around the Xc axis of the angular velocity signal around the Xs axis have opposite signs with respect to the angular velocity signal around the Zs axis and the angular velocity signal around the Xs axis of the gyro sensor 21a. Such ab aspect is also an example of the inverted arrangement.

What is claimed is:
1. An inertia detection device comprising:
one set of inertia sensors arranged in a same physical quantity range in which sensor movement is detected as the same physical quantity, for the set of inertia sensors to detect a physical quantity along a same direction due to a movement of a detection target object, the one set of inertia sensors includes a first sensor configured to output a first output signal and a second sensor configured to output a second output signal, such that a sign of the first output signal is opposite to a sign of the second output signal, and an abnormality determination unit configured to determine that one of the first sensor and the second sensor is abnormal in response to a sum of the first output signal and the second output signal being greater than a difference threshold, wherein when one of the first sensor and the second sensor is determined to be abnormal, the abnormality determination unit is configured to compare the first output signal with a first output signal threshold value, compare the second output signal with a second output signal threshold value, and specify which of the first sensor or the second sensor is abnormal, wherein the first output signal threshold value and the second output signal threshold value are determined for the first sensor and the second sensor, respectively.

2. The inertia detection device of claim 1, wherein:

the first sensor and the second sensor are configured in an inverted arrangement, such that a first reference axis of the first sensor is antiparallel to a second reference axis of the second sensor.

3. The inertia detection device of claim 2, wherein the first sensor and the second sensor are both mounted on one surface of a substrate, and a direction of the first reference axis of the first sensor is 180 degrees opposite to a direction of the second reference axis of the second sensor.

4. The inertia detection device of claim 2, which is mounted on a vehicle, wherein the first sensor and the second sensor are both configured to detect a yaw rate of the vehicle, the first sensor is configured to detect a first yaw rate with respect to a vertically downward axis, and the second sensor is configured to detect a second yaw rate with respect to a vertically upward axis that is 180 degrees opposite to the vertically downward axis.

5. The inertia detection device of claim 1, wherein a respective angle formed between one reference axis of the first sensor and one reference axis of the second sensor is greater than zero degrees and less than 180 degrees.

6. The inertia detection device of claim 1, wherein the first sensor has a first present mounting orientation, and the second sensor has a second present mounting orientation, the abnormality determination unit is configured to determine whether or not at least one of the first and second sensors is abnormal, and the abnormality determination unit is configured:

(i) compare a magnitude of the first output signal from the first sensor against a magnitude of the second output signal from the second sensor; and (ii) determine that at least one of the first and second sensors is abnormal when a difference in magnitudes is greater than a magnitude difference threshold.

7. The inertia detection device of claim 6, wherein the abnormality determination unit identifies, as abnormal, a sensor whose output signal, during a predetermined period of time in a stable state, changes by an amount equal to or greater than a threshold value.

8. The inertia detection device of claim 7, wherein the inertial detection device is mounted on a vehicle, and wherein the stable state includes a state during a time when the vehicle is stopped.

9. The inertia detection device of claim 8, wherein the first sensor is a first gyro sensor that detects the yaw rate of the vehicle, and the stable state includes a state when the vehicle travels straight.

10. The inertia detection device of claim 6, wherein the inertia detection device further includes:

at least one microcontroller, and wherein the at least one microcontroller is configured to acquire output signals from the first sensor and from the second sensor.

11. An inertial detection device comprising:

a first sensor configured to:

(i) detect a first angular velocity about a first sensor axis, and (ii) generate a first angular velocity signal;

a second sensor configured to:

(i) detect a second angular velocity about a second sensor axis, and (ii) generate a second angular velocity signal, wherein the first sensor axis points:

(i) in a same direction as the second sensor axis, or (ii) in an opposite direction that is defined as opposite to the second sensor axis, an abnormality determination unit configured to determine that one of the first sensor and the second sensor is abnormal in response to a first error condition being satisfied, wherein the first error condition is associated with:

(i) the first angular velocity, (ii) the second angular velocity, and (iii) a difference threshold, wherein when one of the first sensor and the second sensor is determined to be abnormal, the abnormality determination unit is configured to compare the first output signal with a first output signal threshold value, compare the second output signal with a second output signal threshold value, and specify which of the first sensor or the second sensor is abnormal, and wherein the first output signal threshold value and the second output signal threshold value are determined for the first sensor and the second sensor, respectively.

12. The inertial detection device of claim 11, wherein the first sensor axis points in the opposite direction, wherein the first error condition is defined as satisfied when a sum of the first angular velocity signal plus the second angular velocity signal is greater than the difference threshold, wherein if the first error condition is satisfied, then at least one of the first and second sensors is determined to be abnormal.

13. The inertial detection device of claim 12, wherein, upon a determination that the first error condition is satisfied, the abnormality determination unit is further configured to determine whether a second error condition is satisfied, wherein a first offset change amount is an offset value of the first angular velocity signal when a vehicle is stopped, wherein the second error condition is based at least partly upon whether the first offset change amount is greater than a first offset threshold.

14. The inertial detection device of claim 13, wherein, upon a determination that the first offset change amount is greater than the first offset threshold, the abnormality determination unit outputs an error signal indicating that the first angular velocity signal is abnormal.

15. The inertial detection device of claim 11, wherein the first error condition is satisfied when:

$$abs[abs(Sa)-abs(Sb)] > THd,$$

wherein abs(Sa) is an absolute value of the first angular velocity signal, wherein abs(Sb) is an absolute value of the second angular velocity signal, and wherein THd is the difference threshold.

16. The inertial detection device of claim 15, wherein, upon a determination that the first error condition is satisfied, the inertial detection device is further configured to generate one of at least four possible error signals:

(i) upon a determination that $\Delta Sa > THa$, and $\Delta Sb \leq THb$, then the abnormality determination unit is configured to output a first error signal indicating that the first sensor appears abnormal and that the second sensor appears normal, such that the second sensor may be used;

(ii) upon a determination that $\Delta Sa \leq THa$, and $\Delta Sb > THb$, then the abnormality determination unit is configured to output a second error signal indicating that the first sensor appears normal and that the second sensor appears abnormal, such that the first sensor may be used;

(iii) upon a determination that $\Delta Sa > THa$, and $\Delta Sb > THb$, then the abnormality determination unit is configured to output a third error signal indicating that both of the first and second sensors appear to be abnormal; and (iv) upon a determination that $\Delta Sa \leq THa$, and $\Delta Sb \leq THb$, then the abnormality determination unit is configured to output a fourth error signal indicating indeterminateness, wherein $\Delta Sa$ is an offset value of the first angular velocity signal, wherein $\Delta Sb$ is an offset value of the second angular velocity signal, wherein THa is a first offset threshold, and wherein THb is a second offset threshold.

17. The inertial detection device of claim 11, wherein the first sensor axis points in the opposite direction, wherein the first error condition is defined as satisfied when a sum of the first angular velocity signal plus the second angular velocity signal is greater than the difference threshold, wherein, upon a determination that the first error condition is satisfied, the inertial detection device is further configured to identify one of at least two possible error signals:

(i) upon a determination that $\Delta Sa > THa$, and $\Delta Sb \leq THb$, then the abnormality determination unit is configured to output an error signal indicating that the first sensor appears abnormal and that the second sensor appears normal, such that the second sensor may be used; and (ii) upon a determination that $\Delta Sa \leq THa$, and $\Delta Sb > THb$, then the abnormality determination unit is configured to output a second error signal indicating that the first sensor appears normal and that the second sensor appears abnormal, such that the first sensor may be used, wherein $\Delta Sa$ is an offset value of the first angular velocity signal, wherein $\Delta Sb$ is an offset value of the second angular velocity signal, wherein THa is a first offset threshold, and wherein THb is a second offset threshold.

18. The inertia detection device of claim 1, wherein:

the first output signal threshold value and the second output signal threshold value are set in advance in consideration of individual sensor differences of the first sensor and the second sensor.

19. The inertia detection device of claim 1, wherein:

the first sensor and the second sensor are mounted on the same substrate, the first sensor is mounted on an upper surface of the substrate, and the second sensor is mounted on a lower surface of the substrate.

* * * * *